United States Patent
Kato et al.

(10) Patent No.: US 7,381,756 B2
(45) Date of Patent: Jun. 3, 2008

(54) INK SET, INK JET RECORDING METHOD, RECORDING MATERIAL SET, RECORDING MEDIUM AND RECORDING MATTER

(75) Inventors: Shinichi Kato, Nagano (JP); Shuichi Kataoka, Nagano (JP); Kiyohiko Takemoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 10/349,205

(22) Filed: Jan. 22, 2003

(65) Prior Publication Data
US 2004/0017406 A1 Jan. 29, 2004

(30) Foreign Application Priority Data
Jan. 23, 2002 (JP) ............................. 2002-014822
Jul. 16, 2002 (JP) ............................. 2002-207515

(51) Int. Cl.
*C09D 11/10* (2006.01)
*B41J 2/01* (2006.01)
*B41J 2/17* (2006.01)

(52) U.S. Cl. .................. 523/160; 347/98; 347/100

(58) Field of Classification Search ................ 523/160, 523/161; 106/31.6; 347/98, 100
See application file for complete search history.

(56) References Cited

U.S. PATENT DOCUMENTS

| 5,604,276 | A  | * | 2/1997  | Suga ............................. 524/100 |
| 5,640,187 | A  | * | 6/1997  | Kashiwazaki et al. ........ 347/101 |
| 6,723,784 | B2 | * | 4/2004  | Ito et al. ....................... 524/556 |
| 6,857,733 | B2 | * | 2/2005  | Issler ........................... 347/100 |
| 2001/0020964 | A1 | * | 9/2001 | Irihara et al. .................. 347/43 |
| 2002/0077386 | A1 | * | 6/2002 | Kurabayashi et al. ........ 523/161 |
| 2003/0193553 | A1 | * | 10/2003 | Issler ........................... 347/100 |
| 2004/0032473 | A1 | * | 2/2004 | Ishimoto et al. ............. 347/100 |
| 2004/0092621 | A1 | * | 5/2004 | Kataoka et al. .............. 523/160 |

FOREIGN PATENT DOCUMENTS

| EP | 1145865 A2 | * | 10/2001 |
| JP | 11-058930 |   | 3/1999 |
| JP | 2000-034432 |   | 2/2000 |
| JP | 2000-225695 |   | 8/2000 |
| WO | WO 02/087866 A1 | * | 11/2002 |

OTHER PUBLICATIONS

Machine Translation of JP 2000-034432 A (2000).*
Machine Translation of JP 2000-225695 A (2000).*
Machine Translation of JP 11-058930 A (1999).*
Patent Abstracts of Japan of JP 2000-034432 dated Feb. 2, 2000.
Patent Abstracts of Japan of JP 11-058930 dated Mar. 2, 1999.
Patent Abstracts of Japan of JP 2000-225695 dated Aug. 15, 2000.

* cited by examiner

*Primary Examiner*—Sanza L. McClendon
(74) *Attorney, Agent, or Firm*—Ladas and Parry LLP

(57) ABSTRACT

It is an object of the present invention to provide an ink set which has a superior effect in suppressing gloss unevenness of printed images, and which thus makes it possible to obtain images that have a uniform gloss. The present invention achieves this object by providing an ink set comprising one or more color ink compositions containing a pigment as a coloring agent and a dispersing resin that is used to disperse this pigment, and one or more clear ink compositions which contain an aqueous polymer but which contain no coloring agent, wherein the dispersing resin and the aqueous polymer belong to a common category so that the 60° specular gloss (according to JIS Z 8741) of the printed images that are formed by the abovementioned color ink compositions and/or the abovementioned clear ink composition is substantially uniform.

7 Claims, No Drawings

INK SET, INK JET RECORDING METHOD, RECORDING MATERIAL SET, RECORDING MEDIUM AND RECORDING MATTER

BACKGROUND OF THE INVENTION

1. Field of the Invention

The present invention relates to an ink set, ink jet recording method, recording material set, recording medium and recorded matter which have a superior effect in suppressing gloss unevenness of printed images, and which thus make it possible to obtain images that have a uniform gloss.

2. Description of the Related Art

Conventionally, various types of ink jet recording methods using ink compositions that contain pigments as coloring agents have been proposed as a means of obtaining high-quality images, and especially superior light resistance and a high degree of image fastness. Furthermore, techniques have also been developed which are devised so that the generation of large variations in the gloss of the printed images obtained according to the ink duty is suppressed by using an ink set employing a clear ink composition which contains no coloring agents such as pigments or the like, and which contain a polymer or the like, together with an ink composition containing such pigments.

However, even in conventional ink sets comprising of a color ink composition and a clear ink composition, gloss unevenness is sometimes generated in the printed images that are formed, and there have been cases in which such ink sets are inadequate for obtaining a uniform gloss.

SUMMARY OF THE INVENTION

Accordingly, it is an object of the present invention to provide an ink set, ink jet recording method, recording material set, recording medium and recorded matter which have a superior effect in suppressing gloss unevenness of printed images, and which thus make it possible to obtain images that have a uniform gloss.

As a result of diligent research, the inventors discovered that the abovementioned problems can be solved by using an ink set including a color ink composition containing a pigment and dispersing resin, and a clear ink composition which contains an aqueous polymer but does not contain any coloring agent, in which the abovementioned dispersing resin and the abovementioned aqueous polymer are in a specific relationship.

Furthermore, the inventors discovered that the abovementioned problems can be solved by treating the recording medium with a composition which contains an aqueous polymer that is in a specific relationship with the dispersing resin contained in the color ink composition.

The present invention is based on the abovementioned findings. The present invention provides an ink set comprising one or more color ink compositions containing a pigment as a coloring agent and a dispersing resin used to disperse this pigment, and one or more clear ink compositions that contain an aqueous polymer and that contain no coloring agent, wherein the abovementioned dispersing resin and the abovementioned aqueous polymer belong to a common category so that the 60° specular gloss (according to JIS Z 8741) of the printed images formed by the abovementioned color ink compositions and/or the abovementioned clear ink compositions is substantially uniform.

Furthermore, the present invention also provides an ink jet recording method (hereafter referred to as the "first recording method") which uses the abovementioned ink set, wherein printed images are formed on a recording medium by discharging the abovementioned color ink composition and abovementioned clear ink composition in the abovementioned ink set at the same treatment time.

Another aspect of the present invention provides an ink jet recording method (hereafter referred to as the "second recording method") which uses one or more color ink compositions containing a pigment as a coloring agent and a dispersing resin that is used to disperse this pigment, and one or more compositions containing an aqueous polymer, wherein the abovementioned dispersing resin and the abovementioned aqueous polymer contained in the abovementioned compositions containing an aqueous polymer belong to a common category so that the 60° specular gloss (according to JIS Z 8741) of the entire surface of the recorded matter formed by the abovementioned ink jet recording method is substantially uniform, and wherein the recording medium is treated with the abovementioned compositions containing an aqueous polymer prior to the discharge, after the discharge or simultaneously with the discharge of the abovementioned color ink compositions.

Furthermore, the present invention also provides a recording material set comprising one or more color ink compositions containing a pigment as a coloring agent and a dispersing resin used to disperse this pigment, and a recording medium which has an ink receiving layer constructed from a composition containing an aqueous polymer, wherein the abovementioned dispersing resin and the aqueous polymer in the abovementioned composition containing an aqueous polymer belong to a common category so that the 60° specular gloss (according to JIS Z 8741) of the surface of the recorded matter formed by the abovementioned recording material set is substantially uniform.

Furthermore, the present invention also provides a recording medium which has an ink receiving layer constructed from a composition containing an aqueous polymer, wherein the aqueous polymer in the abovementioned composition containing an aqueous polymer is the same substance as the dispersing resin in the color ink compositions that are discharged onto the recording medium.

The method used to manufacture the recording medium of the present invention comprises a step in which an ink receiving layer is formed on a support using a composition containing an aqueous polymer that is the same substance as the dispersing resin in the color ink compositions that are discharged onto the recording medium.

Furthermore, the present invention also provides recorded matter in which printed images are formed on a recording medium using the abovementioned ink set, the abovementioned recording method, the abovementioned recording material set or the abovementioned recording medium.

DETAILED DESCRIPTION OF THE PREFERRED EMBODIMENTS

The present invention will be described in detail below on the basis of preferred embodiments.

(Ink Set)

The ink set of the present invention comprises one or more color ink compositions containing a pigment as a coloring agent and a dispersing resin that is used to disperse this pigment, and one or more clear ink compositions which contains an aqueous polymer but which contains no coloring agent.

Furthermore, in the present specification, the term "color ink composition" refers to a colored (monochromatic) ink composition which has color as a result of a pigment used as a coloring agent; in addition to ink compositions such as yellow, magenta, cyan and the like, this term includes black ink compositions and the like.

Furthermore, the term "clear ink composition" refers to an ink composition which contains no coloring agent, and which is therefore ordinarily colorless and transparent.

Furthermore, the term "aqueous polymer" refers to a configuration that can generally be adopted by a polymer in water in accordance with the particle size of the polymer, namely, (1) an aqueous solution in which a water-soluble resin is dissolved at the molecular level, (2) a configuration in which a resin that is relatively or completely insoluble in water is dispersed in the form of fine particles (generally expressed as an emulsion, dispersion, latex or suspension), or (3) resins in general which can adopt the configuration of a colloidal dispersion showing characteristics that are intermediate between the abovementioned configurations of (1) and (2).

Furthermore, the ink set of the present invention is an ink set in which the abovementioned dispersing resin and the abovementioned aqueous polymer belong to a common category so that the 60° specular gloss as measured by a gloss meter (in accordance with JIS Z 8741) of the printed images formed by the abovementioned color ink compositions and/or the abovementioned clear ink compositions is uniform.

Furthermore, the gloss is measured using a PG-1M gloss meter (manufactured by Nippon Denshoku Kogyo K.K.).

Since the ink set of the present invention has the abovementioned constitution, this ink set has a superior effect in suppressing gloss unevenness of the printed images, and makes it possible to obtain images that have a uniform gloss.

In the present specification, the term "substantially uniform gloss" refers to the fact that there is substantially no difference in gloss in recorded matter in which printed images are formed on a recording medium by means of the ink set of the present invention, in any portion of the printed images of this recorded matter (i. e., the same recorded matter).

In concrete terms, this refers to the fact that a uniform gloss of the printed images can be maintained, subject to hardly any effect by the ink duty values of the color ink compositions, the types or concentrations of the pigments in the color ink compositions, the type of the recording medium (printing medium; limited to glossy media in this case) or the like. For example, it is desirable that the 60° specular gloss (according to JIS Z 8741) show a variation of 10% or less.

Here, the term "glossy medium" refers to a medium that shows gloss regardless of the viewing angle; in concrete terms, this is defined as a medium in which the 20°, 60° and 85° specular gloss values (according to JIS Z 8741) are all 10 or greater. An example of the glossy medium may include PM photographic paper manufactured by Seiko-Epson K.K.

Furthermore, the term "ink duty" is defined by the following Equation (1), and refers to a value that shows units of the calculated value D.

$$D=\{\text{number of printed character dots}/(\text{vertical resolution} \times \text{horizontal resolution})\} \times 100 \text{ (duty)} \quad (1)$$

(In the above equation, the "number of printed character dots" refers to the number of printed character dots per unit area, and the "vertical resolution" and "horizontal resolution" respectively refer to the resolution values per unit area.)

In particular, in the present invention, the ratio of the maximum value of the gloss to the minimum value of the gloss of the printed images that are obtained (maximum value/minimum value; hereafter referred to as the "gloss ratio") when the ink duty values of color ink compositions of the same color are varies, and the gloss ratio of the printed images that are obtained when the type of color ink composition used is varied (e. g., when the type or concentration of the pigment is varied), are small.

Accordingly, the gloss of printed images formed by the ink set of the present invention is substantially uniform between different ink duty values of the same color, and between different colors.

In the present invention, the dispersing resin in the color ink compositions and the aqueous polymer in the clear ink compositions belong to a common category so that the gloss is substantially uniform as described above.

It is inferred that if the abovementioned dispersing resin and aqueous polymer thus belong to a common category, components such as the solvent and the like in the respective ink compositions are dried when printed images are formed by the ink set of the present invention, and the coating film in the images formed by the remaining polymer is substantially uniform, so that the gloss of the images is substantially uniform.

Polymers (resins) that belong to a common category include polymers in ranges which are such that the coating films formed by the polymers have the same properties; examples of such polymers include polymers whose type, molecular weight, functional groups, particle size, acid value, Tg (glass transition temperature) and the like belong to the same category.

In particular, if the abovementioned dispersing resin and the abovementioned aqueous polymer are the same substance, gloss unevenness of the printed images can be more effectively suppressed, so that the uniform gloss can be greatly improved. Accordingly, it is desirable that the dispersing resin contained in the color ink compositions and the aqueous polymer contained in the clear ink compositions be the same substances appropriately selected from the examples described below.

Here the term "same substance" refers to polymers whose type and characteristics such as molecular weight, structure and the like agree to an extent that the effect of the present invention can be achieved. For example, some of the substituent groups or the like may differ within ranges that allow the effect of the present invention to be achieved; however, it is desirable that the abovementioned characteristics show complete agreement.

In the present invention, there are no particular restrictions on the dispersing resin used in the color ink compositions or the aqueous polymer used in the clear ink compositions, as long as these polymers belong to a common category. For example, aqueous polymers that can adopt various configurations may be used; in concrete terms, polymers that can adopt any of the configurations of an aqueous solution, colloidal dispersion or emulsion may be used.

Desirable examples of the aqueous polymers include natural polymers. Concrete examples of such polymers include proteins such as glue, gelatin, casein, albumin and the like, natural gums such as gum arabic, traganth gum and the like, glucosides such as saponin and the like, alginic acid derivatives such as alginic acid, alginic acid propylene glycol esters, triethanolamine alginate, ammonium alginate and the like, and cellulose derivatives such as methylcellulose, carboxymethylcellulose, hydroxyethylcellulose, ethylhydroxycellulose and the like.

Furthermore, desirable examples of the abovementioned aqueous polymer include synthetic polymers. Examples of such polymers include polyvinyl alcohols, polyvinylpyrrolidones, acrylic resins such as polyacrylic acids, acrylic acid-acrylonitrile copolymers, potassium acrylate-acrylonitrile copolymers, vinyl acetate-acrylic acid ester copolymers, acrylic acid-acrylic acid ester copolymers, and the like, styrene-acrylic resins such as styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, and the like, styrene-maleic-acid copolymers, styrene-maleic anhydride copolymers, vinylnaphthalene-acrylic acid copolymers, vinylnaphthalene-maleic acid copolymers, and vinyl acetate copolymers such as vinyl acetate-ethylene copolymers, vinyl acetate-fatty acid vinylethylene copolymers, vinyl acetate-maleic acid ester copolymers, vinyl acetate-crotonic acid copolymers, vinyl acetate-acrylic acid copolymers and the like, as well as salts of the same. Among these polymers, copolymers consisting of monomers that have hydrophobic groups and monomers that have hydrophilic groups, and polymers consisting of monomers that have both hydrophobic groups and hydrophilic groups in the molecular structure, are especially desirable. Such copolymers may be either random copolymers or block copolymers. Examples of the abovementioned salts include salts with diethylamine, ammonia, ethylamine, triethylamine, propylamine, isopropylamine, dipropylamine, butylamine, isobutylamine, triethanolamine, diethanolamine, aminomethylpropanol, morpholine and the like. It is sufficient if these compounds used to form salts are equal to or greater than the neutralizing equivalent of the dispersing agent consisting of organic matter prior to the formation of the salt; however, it is desirable from the standpoint of the fixing characteristics following printing that the amount added be approximately 1.3 times of the neutralizing equivalent.

It is desirable that the weight average molecular weight of these copolymers be 1000 to 50,000, and a molecular weight of 3000 to 10,000 is even more desirable.

In the present invention, especially desirable aqueous polymers are salts of styrene-(meth)acrylic acid copolymers. Such salts of styrene-(meth)acrylic copolymers basically refer to salts that contain at least a styrene backbone and a (meth)acrylic acid salt backbone in the structure of the molecule; such salts may also contain a backbone originating in a monomer that has other unsaturated groups, such as a (meth)acrylic acid ester backbone or the like in the structure. Such salts of styrene-(meth)acrylic acid copolymers may be salts of either random copolymers or block copolymers, and may be manufactured by a universally known polymerization method such as radical copolymerization, group transfer copolymerization or the like. The acid value of such salts of styrene-(meth)acrylic acid copolymers is preferably in the range of 50 to 300, and is even more preferably in the range of 70 to 150. Furthermore, the molecular weight in terms of weight average molecular weight is preferably in the range of 1000 to 50,000, more preferably in the range of 1000 to 15,000, and even more preferably in the range of 3000 to 10,000.

Furthermore, a commercially marketed polymer may be used as the abovementioned aqueous polymer; concrete examples of such commercially marketed polymers include Joncryl 61J (molecular weight 10,000, acid value 195), Joncryl 68 (molecular weight 10,000, acid value 195), Joncryl 450 (molecular weight 10,000 to 20,000, acid value 100), Joncryl 680 (molecular weight 3900, acid value 215), Joncryl 682 (molecular weight 1600 acid value 235), Joncryl 550 (molecular weight 7500, acid value 200), Joncryl 555 (molecular weight 5000, acid value 200), Joncryl 586 (molecular weight 3100, acid value 105), Joncryl 683 (molecular weight 7300, acid value 150); B-36 (molecular weight 6800, acid value 250) and the like.

Among the abovementioned aqueous polymers, polymers that can adopt an emulsion configuration can be mixed with the ink composition as a resin emulsion of the aqueous polymer, and this resin emulsion of the aqueous polymer can be manufactured by universally known emulsion polymerization. For example, a resin emulsion of such an aqueous polymer can be manufactured by subjecting an unsaturated vinyl monomer to emulsion polymerization in water in the presence of a surfactant (emulsifying agent), polymerization catalyst, polymerization initiator, molecular weight adjusting agent, neutralizing agent and the like.

The color ink compositions and clear ink compositions used in the ink set of the present invention may consist of a single composition each, or may be a plurality of compositions. In particular, a combination consisting of two or more of the abovementioned color ink compositions and a single clear ink composition is desirable from the standpoint of increasing the effect of the present invention.

As was described above, the color ink compositions used in the ink set of the present invention contain a pigment as a coloring agent and a dispersing resin which is used to disperse this pigment; other components of these color ink compositions are similar to the components contained in ordinary compositions used for ink jet recording.

The pigment content is preferably 0.1 to 20 wt %, and even more preferably 0.2 to 10 wt %, of the color ink composition. This pigment content may be appropriately adjusted in accordance with the type of ink composition involved, i. e., light or dark color ink composition or the like.

There are no particular restrictions on the types of color ink composition used; for example, black ink compositions, light black ink compositions, yellow ink compositions, magenta ink compositions, light magenta ink compositions, cyan ink compositions, light cyan ink compositions, blue ink compositions, red ink compositions, violet ink compositions, green ink compositions, dark yellow ink compositions and the like may be used in accordance with the type and concentration (content) of the pigment used.

There are no restrictions on the pigments used in these color ink compositions; the following pigments are desirable examples of the pigments.

Examples of black pigments that may be contained in black ink compositions and light black ink compositions include various types of carbon black such as furnace black, lamp black, acetylene black, channel black or the like (C. I. pigment black 7). In more concrete terms, No. 2300, No. 900, MCF88, No. 33, No. 40, No. 45, No. 52, MA7, MA8, MA100, No. 2200B and the like manufactured by Mitsubishi Kagaku K.K.; MA-7; Raven 5750, Raven 5250, Raven 5000, Raven 3500, Raven 1255, Raven 700 and the like manufactured by Columbia Co.; Regal 400R, Regal 330R, Rega 1660R, Mogul L, Monarch 700, Monarch 800, Monarch 880, Monarch 900, Monarch 1000, Monarch 1100, Monarch 1300, Monarch 1400 and the like manufactured by Cabot Co.; and Color Black FW1, Color Black FW2, Color Black FW2V, Color Black FW18, Color Black FW200, Color Black S150, Color Black S160, Color Black 170, Printex 35, Printex U, Printex V, Printex 140U, Special Black 6, Special Black 5, Special Black 4A, Special Black 4 and the like manufactured by Degussa Co.

Examples of pigments that can be used in yellow ink compositions include C. I. pigment yellow—1 (fast yellow G), 2, 3, 12 (disazo yellow AAA), 13, 14, 16, 17, 24, 34, 35, 37, 42 (yellow iron oxide), 53, 55, 73, 74, 75, 81, 83 (disazo yellow HR), 93, 95, 97, 98, 100, 101, 104, 108, 109, 110, 114, 117, 120, 128, 129, 138, 151, 153, 154, 155 and the like.

Examples of pigments that can be used in magenta ink compositions and light magenta ink compositions include C. I. pigment red 1, 2, 3, 5, 7, 12, 17, 22 (brilliant fast scarlet), 23, 31, 38, 48 (Ca), 48 (Mn), 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57 (Ca), 57:1 (brilliant carmine 6B), 60:1, 63:1, 63:2, 64:1, 81 (rhodamine 6G lake), 83, 88, 101 (iron oxide red), 104, 105, 106, 108 (cadmium red), 112, 114, 122 (quinacridone magenta), 123, 146, 149, 166, 168, 170, 172, 177, 178, 179, 184, 185, 190, 193, 202, 209, 219, 264, C. I. pigment violet 19, 42 and the like.

Examples of pigments that can be used in cyan ink compositions and light cyan ink compositions include C. I. pigment blue 1, 2, 3, 15 (phthalocyanine blue R), 15:1, 15:2, 15:3 (phthalocyanine blue G), 15:4, 15:6 (phthalocyanine blue E), 15:34, 16, 17:1, 22, 56, 60, 63, C. I. vat blue 4, C. I. vat blue 60 and the like.

Examples of pigments that can be used in violet ink compositions include pigment violet 3, 9, 23, 32, 36, 38 and the like.

Examples of pigments that can be used in green ink compositions include C. I. pigment green 1, 4, 7, 8, 10, 17, 18, 36 and the like.

In particular, it is desirable to use cyan ink compositions, magenta ink compositions, yellow ink compositions and black ink compositions as the color ink compositions in cases where character images are formed, and to use light color ink compositions such as light cyan ink compositions, light magenta ink compositions and the like in addition to the abovementioned color ink compositions (dark color ink compositions) in cases where photographic images are formed.

Furthermore, the dispersing resins contained in the color ink compositions are generally used in order to achieve a stable dispersion of water-insoluble pigments in aqueous inks. Accordingly, the color ink compositions are ordinarily used as aqueous ink compositions which contain water, preferably pure water, along with pigments and dispersing resins.

Details regarding the dispersing resins are as was described above.

It is desirable that the color ink compositions be prepared by first preparing a pigment dispersion that is obtained by dispersing the pigment beforehand (using a dispersing resin) in an aqueous medium containing a surfactant, and then adding other components to this pigment dispersion as required.

The content of the dispersing resin is preferably 0.01 to 40 wt %, and even more preferably 0.02 to 20 wt %, of the color ink composition. Furthermore, this content corresponds to the amount of the polymer component in cases where the dispersing resin is used in a configuration such as a resin emulsion of an aqueous polymer or the like.

Furthermore, organic solvents may be used as the aqueous media that are used to prepare the pigment dispersion. Examples of such organic solvents include monohydric alcohols such as methanol, ethanol, n-propyl alcohol, isopropyl alcohol, n-butanol, sec-butanol, tert-butanol, isobutanol, n-pentanol and the like, polyhydric alcohols such as ethylene glycol, diethylene glycol, triethylene glycol, polyethylene glycols, polypropylene glycols, propylene glycol, butylene glycol, 1,2,6-hexanetriol, thioglycol, hexylene glycol, trimethylolethane, trimethylolpropane, glycerol and the like, alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and the like, and other compounds such as urea, 2-pyrrolidone, N-methyl-2-pyrrolidone, 1,3-dimethyl-2-imidazolidinone, triethanolamine and the like. These organic solvents may be used singly or in mixtures consisting of two or more solvents.

The content of the organic solvent is preferably in the range of 0.5 to 40 wt %, and even more preferably in the range of 1.5 to 30 wt %, of the color ink composition.

Furthermore, surfactants may be mixed with the color ink compositions. For example, acetylene glycol type surfactants (e. g., Olfine Y, E1010, STG (all manufactured by Nisshin [Ka]gaku Kogyo K.K.) and Surfinol 82, 104, 440, 465 and 485 (all manufactured by Air Products and Chemicals Inc.)and the like) are desirable for use; in addition, anionic surfactants (e. g., sodium dodecylbenzenesulfonate, sodium laurate, ammonium salts of polyoxyethylene alkyl ether sulfates and the like), and nonionic surfactants (e. g., polyoxyethylene alkyl ethers, polyoxyethylene alkyl esters, polyoxyethylene sorbitan fatty acid esters, polyoxyethylene alkylphenyl ethers, polyoxyethylene alkylamines, polyoxyethylene alkylamides and the like), may also be used.

These surfactants may be used singly or in mixtures consisting of two or more surfactants. Furthermore, in cases where the abovementioned dispersing resin is used in the configuration of a resin emulsion of an aqueous polymer, these surfactants may be included in the resin emulsion beforehand.

The amount of surfactant that is added is preferably 0.01 to 5 wt %, and even more preferably 0.05 to 1.5 wt %, of the color ink composition.

In addition to the components described above, the color ink compositions may also contain components similar to the components that are contained in ordinary ink compositions used for ink jet recording. For example, pH adjusting agents, preservatives, anti-mold agents, dissolution assistants, antioxidants, viscosity adjusting agents and the like may be added as necessary.

The clear ink compositions used in the ink set of the present invention contain an aqueous polymer as an essential component.

The content of this aqueous polymer is preferably 0.1 to 10 wt %, and even more preferably 0.3 to 5 wt %, of the clear ink composition. Furthermore, in cases where the aqueous polymer is used in a configuration such as a resin emulsion or the like, this content corresponds to the amount of the resin component.

Furthermore, unlike ordinary ink compositions, the clear ink compositions contain no coloring agent; accordingly, there is no need for a dispersing resin used to disperse such a coloring agent. Components other than the aqueous polymer contained in the clear ink compositions are similar to the components other than the pigment and dispersing resin contained in the abovementioned color ink compositions. Accordingly, in regard to details concerning optional components that may be contained in the clear ink compositions, the facts described with reference to the abovementioned color ink compositions may be appropriately applied.

(Ink Jet Recording Method)

First Recording Method

The present invention provides an ink jet recording method (first recording method) using the abovementioned ink set, wherein printed images are formed on a recording medium by discharging the color ink compositions and clear ink compositions in the ink set at the same treatment time.

Furthermore, in the present specification, the term "same treatment time" refers to a case in which a treatment is performed so that a single predetermined image is formed by both the color ink compositions and clear ink compositions in a single recording operation (single pass). Accordingly, in addition to cases in which both types of compositions are discharged at exactly the same time, the term "same treatment time" also includes cases in which the color ink compositions are discharged first, after which the clear ink compositions are discharged, within a single pass, and cases in which the clear ink compositions are discharged first, after which the color ink compositions are discharged, within a single pass.

In the first recording method of the present invention, the effect can be enhanced by adjusting the discharge amounts of the clear ink compositions in accordance with the ink duty values of the color ink compositions in the ink set. In concrete terms, it is desirable that the discharge amounts of the clear ink compositions be increased in cases where the ink duty values of the color ink compositions are low, and that the discharge amounts of the clear ink compositions be reduced in cases where the ink duty values of the color ink compositions are high.

Since the first recording method of the present invention uses the abovementioned ink set, gloss unevenness of the printed images that are formed can be effectively suppressed, so that uniform gloss can be imparted to the images that are obtained.

Second Recording Method

Another aspect of the present invention provides an ink jet recording method (second recording method) which uses one or more color ink compositions containing a pigment as a coloring agent and a dispersing resin that is used to disperse this pigment, and one or more compositions containing an aqueous polymer, wherein the abovementioned dispersing resin and the abovementioned aqueous polymer contained in the abovementioned compositions containing an aqueous polymer belong to a common category so that the 60° specular gloss (according to JIS Z 8741) of the entire surface of the recorded matter formed by the abovementioned ink jet recording method is substantially uniform, and wherein the recording medium is treated with the abovementioned compositions containing an aqueous polymer prior to the discharge, after the discharge or simultaneously with the discharge of the abovementioned color ink compositions.

The second recording method of the present invention consists of the abovementioned constitution; as a result, gloss unevenness of the printed images that are formed can be suppressed, so that images with uniform gloss can be obtained.

In the method of the present invention, the term "substantially uniform gloss" refers to the fact that there is substantially no difference in gloss on the surface of recorded matter in which printed images are formed on a recording medium by the recording method of the present invention, in any portion of the printed images of this recorded matter (i. e., the same recorded matter).

In concrete terms, this refers to the fact that a uniform gloss of the printed images can be maintained, subject to hardly any effect by the ink duty values of the color ink compositions, the types or concentrations of the pigments in the color ink compositions or the like. For example, it is desirable that the 60° specular gloss (according to JIS Z 8741) show a variation of 10% or less.

Furthermore, the term "ink duty" has the meaning described above in the section referring to the ink set.

In particular, in the present invention, the ratio of the maximum value of the gloss to the minimum value of the gloss of the printed images that are obtained (maximum value/minimum value). Thereafter referred to as the "gloss ratio") when the ink duty values of color ink compositions of the same color are varies, and the gloss ratio of the printed images that are obtained with the type of color ink composition used is varied (e. g., when the type or concentration of the pigment is varied), are small.

Accordingly, in particular, the gloss of printed images formed by the recording method of the present invention is substantially uniform between different ink duty values of the same color, and between different colors.

In the present invention, the dispersing resin in the color ink compositions and the aqueous polymer in the compositions containing an aqueous polymer belong to a common category so that the gloss is substantially uniform as described above.

It is inferred that if the abovementioned dispersing resin and aqueous polymer thus belong to a common category, when recorded matter is formed by the second recording method of the present invention, components such as the solvent and the like in the respective ink compositions are dried and the coating film in the images formed by the remaining polymer and the coating film formed by the polymer with which the recording medium is treated is substantially uniform, so that the gloss of the surface of the coated matter (printed images) is substantially uniform.

Polymers (resins that belong to a common category include polymers in ranges which are such that the coating films formed by the polymers have the same properties; examples of such polymers include polymers whose type, molecular weight, functional groups, particle size, Tg (glass transition temperature) and the like belong to the same category.

In particular, if the abovementioned dispersing resin and the abovementioned aqueous polymer are the same substance, gloss unevenness of the printed images can be more effectively suppressed, so that the uniform gloss can be greatly improved.

Here the term "same substances" refers to polymers whose type and characteristics such as molecular weight, structure and the like agree to an extent that the effect of the present invention can be achieved. For example, some of the substituent groups or the like may differ within ranges that allow the effect of the present invention to be achieved; however, it is desirable that the abovementioned characteristics show complete agreement.

Compounds similar to the aqueous polymers indicated as examples in the abovementioned ink set can be used as the dispersing resins in the color ink compositions and aqueous polymers in the compositions containing an aqueous polymer. Identical substances may be appropriately selected from the abovementioned examples and used.

Similarly, in regard to components other than dispersing resins contained in the color ink compositions, components similar to those described in the abovementioned ink set may be appropriately used.

Furthermore, other descriptions (mixture amounts and the like) regarding the color ink compositions may be appropriately applied.

The compositions containing an aqueous polymer contain the abovementioned aqueous polymer as an essential component. There are no particular restrictions on the content of the aqueous polymer in these compositions containing an aqueous polymer, as long as this content is in a range that allows the effect of the present invention to be achieved; this content may also fluctuate in accordance with the method used to treat the recording medium with such compositions containing an aqueous polymer. Components other than the aqueous polymer contained in these compositions containing an aqueous polymer may be any desired components, as long as the effect of the invention can be achieved; components appropriate for inclusion may be selected in accordance with the method used to treat the recording medium. Furthermore, concrete examples of compositions containing an aqueous polymer will be shown below; however, the present invention is not limited to the following concrete examples.

For example, in cases where the process in which the recording medium is treated with compositions containing an aqueous polymer in the recording method of the present invention is a treatment in which such compositions containing an aqueous polymer are discharged onto the recording medium using an ink jet printer, the previously described clear ink compositions (i.e., the clear ink compositions used in the ink set) may be used as these compositions containing an aqueous polymer.

Furthermore, if the process in which the recording medium is treated with a composition containing an aqueous polymer is the process in which the recording medium is coated with a composition containing an aqueous polymer, this composition containing an aqueous polymer may be a coating liquid which is used to form a layer on the surface of the recording medium. In more concrete terms, this composition may be a coating liquid which is used to form an ink receiving layer on the recording medium.

In cases where the composition containing an aqueous polymer is a coating liquid that is used to form an ink receiving layer, there are no particular restrictions on components other than the abovementioned aqueous polymer that is contained in the composition, as long as these components are components that are ordinarily contained in an ink receiving layer.

Components other than the abovementioned aqueous polymer that may be included in such a coating liquid that is used to form an ink receiving layer generally include ink absorbing pigments, and may also include various types of additives such as ink fixing agents, binders, impregnating agents, surfactants, dye fixing agents (anti-hydration agents), fluorescent whiteners, defoaming agents, pH adjusting agents, anti-mold agents, ultraviolet absorbing agents, antioxidants, leveling agents, viscosity adjusting agents and the like if necessary.

Conventional universally known agents may be used as ink absorbing pigments. In particular, minute inorganic particles that are porous and have a low refractive index are desirable in order to obtain a high ink absorptivity and coloring density. For example, amorphous silica, precipitated silica, gel type silica, alumina (preferably alumina with a quasi-boehmite structure), vapor phase process silica, barium sulfate, titanium dioxide, calcium carbonate, kaolin, clay, magnesium silicate, calcium silicate and the like may be used. Among these substances, vapor phase process silica is most desirable from the standpoints of high ink absorptivity and gloss.

It is desirable that these minute inorganic particles have a mean primary particle size of 30 nm or smaller, preferably 3 to 20 nm. Furthermore, it is desirable that the specific surface area as measured by the BET method be 200 $m^2/g$ or greater, preferably 250 to 500 $m^2/g$.

The amount of minute inorganic particles used in the ink receiving layer fluctuates according to the characteristics of the coating film; ordinarily, this amount is 8 g or greater, preferably 13 to 30 g, per square meter of the recording medium.

Such a coating liquid is ordinarily prepared by dissolving or dispersing the components that form the ink receiving layer in water or an appropriate solvent. Furthermore, in cases where the components that form the receiving layer are already in a configuration that contains a solvent, such as an emulsion or the like, a separate solvent may not be used. Moreover, solvents that are appropriate for use include solvents that are conventionally used in coating liquids.

Furthermore, the color ink compositions and compositions containing an aqueous polymer that are used in the second recording method of the present invention may respectively consist of single compositions, or may each consist of a plurality of compositions. In particular, a combination consisting of two or more of the abovementioned color ink compositions and a single composition containing an aqueous polymer is desirable from the standpoint of increasing the effect of the present invention.

Furthermore, it is desirable that the content of the aqueous polymer that is contained in the coating liquid be 0.2 to 20 wt %, preferably 0.5 to 10 wt %, where the total solid content of the coating liquid is taken as 100 wt %. If the aqueous polymer content is within the abovementioned range, images that have more uniform gloss can be obtained. Furthermore, in cases where the aqueous polymer is used in a configuration such as a resin emulsion or the like, this content corresponds to the amount of the resin component.

The recording medium used in the present invention may be a conventional universally known recording medium, and may be appropriately selected in accordance with the treatment method used for the composition containing an aqueous polymer. Furthermore, the recording medium may be a medium in which layers such as an ink receiving layer, glossy layer, anti-curling back layer or the like are formed on a support, or may be a medium which has no such layers.

Here, there are no particular restrictions on the support that is used; a conventional universally known support may be used. For example, a sheet-form substance such as paper or a thermoplastic resin film may be used.

In the case of paper, this paper may have no sizing agent or may be treated with an appropriate sizing agent, and may include or not include a filler.

Furthermore, in the case of a thermoplastic film, transparent films such as polyesters, polystyrenes, polyvinyl chlorides, polymethyl methacrylates, cellulose acetate, polyethylenes, polycarbonate or the like, or white opaque films formed by filling with a white pigment or by fine foaming, may be used. Numerous pigments such as titanium oxide, calcium sulfate, calcium carbonate, silica, clay, talc, zinc oxide and the like may be used as filling white pigments.

Furthermore, so-called laminated papers in which these resin films are pasted to the surface of a paper and worked by means of the fused resin may also be used. The installation of an underlayer or working by means of a corona discharge or the like may also be performed in order to improve the bonding of the resin surfaces and ink receiving layer.

In the second recording method of the present invention, using the abovementioned color ink compositions, composition containing an aqueous polymer and recording medium, the recording medium is treated with the composition containing an aqueous polymer before the discharge, after the discharge or simultaneously with the discharge of the color ink compositions.

Such a treatment of the recording medium will be described below with reference to concrete examples; however, the present invention is not limited by the following concrete examples.

An example of a method in which the recording medium is treated with the composition containing an aqueous polymer prior to the discharge of the color ink compositions includes a method of forming an ink receiving layer on the recording medium in which the composition containing an aqueous polymer is applied to the recording medium by a method such as coating, blowing, spraying, dipping, discharging the composition by means of an ink jet recording he ad or the like and dried prior to the formation of printed images by the discharge of the color ink compositions onto the recording medium.

Furthermore, the expression "prior to the discharge of the color ink compositions" naturally includes cases in which the recording medium is treated with the composition containing an aqueous polymer beforehand prior to recording using the color ink compositions in addition to cases in which the aqueous polymer is applied prior to the discharge of the color ink compositions in a single recording operation (single pass) using the color ink compositions; it goes without saying that this treatment is not limited to a single recording operation (this also applies to the interpretation of the expression "after the discharge of the color ink compositions" described below).

In more concrete terms, An example of the method includes a method of forming an ink receiving layer on the recording medium in which the recording medium is coated with the composition containing an aqueous polymer and dried this coating prior to the formation of printed images by discharging the color ink compositions onto the recording medium from a printer head of a printer used for ink jet recording.

Methods which can be used to coat the recording medium with the composition containing an aqueous polymer include methods in which a coating liquid prepared by dissolving or dispersing the composition containing an aqueous polymer in an appropriate solvent if necessary is applied by appropriately using a method such as a roll coating method, grade coating method, air knife coating method, rod bar coating method, gravure coating method, comma coating method, die coating method, sliding lip coating method, extrusion method or the like.

Furthermore, the coating liquid has already been described in detail.

The weight of the ink receiving layer (amount of application of the coating liquid used to form the ink receiving layer (calculated in terms of solid content)) may be appropriately determined; generally, a value of approximately 5 to 250 g/m$^2$ is desirable.

An ink receiving layer is obtained by appropriately drying the adhering composition containing an aqueous polymer.

Furthermore, a method in which printed images are formed on a recording medium using a recording material set described later is also included in one aspect of the present invention.

An example of a method in which the recording medium is treated with the composition containing an aqueous polymer after the discharge of the color ink compositions includes a method in which a composition containing an appropriate aqueous polymer (if this composition contains an aqueous polymer and allows the effect of the present invention to be achieved, there are no particular restrictions on the composition; for example, the abovementioned clear ink compositions or the like may also be used) is applied to the recording medium by coating, blowing, spraying, dipping, or discharging the composition by means of a head used for ink jet recording or the like after printed images have been formed by discharging the color ink compositions onto the recording medium.

Furthermore, an example of a method in which the recording medium is treated with the composition containing an aqueous polymer simultaneously with the discharge of the color ink compositions includes a method in which the color ink compositions and clear ink compositions are discharge at exactly the same time in a single recording operation (single pass) by ink-jet recording method using the abovementioned ink set.

(Recording Material Set)

The recording material set of the present invention is a recording material set comprising one or more color ink compositions containing a pigment as a coloring agent and a dispersing resin that is used to disperse this pigment, and a recording medium which has an ink receiving layer that is constructed from a composition containing an aqueous polymer, wherein the abovementioned dispersing resin and the aqueous polymer contained in the abovementioned composition containing an aqueous polymer belong to a common category so that the 60° specular gloss (according to JIS Z 8741) of the surface of the recorded matter formed by this recording material set is substantially uniform.

Since the recording material set of the present invention is constituted as described above, gloss unevenness of the surface of the recorded matter formed using the recording material set of the present invention can be suppressed, so that images that have uniform gloss can be obtained.

In the recording material set of the present invention, the term "substantially uniform gloss" refers to the fact that there is substantially no difference in gloss in recorded matter formed using the recording material set of the present invention, in any portion of the printed images on the surface of this recorded matter (i. e., the same recorded matter).

In concrete terms, this refers to the fact that a uniform gloss of the surface of the recorded matter can be maintained, subject to hardly any effect by the ink duty values of the color ink compositions, the types or concentrations of the pigments in the color ink compositions or the like. For example, it is desirable that the 60° specular gloss (according to JIS Z 8741) show a variation of 10% or less.

Furthermore, the term "ink duty" is the same as described in the section concerning the ink set.

In particular, in the present invention, the ratio of the maximum value of the gloss to the minimum value of the gloss of the surface of the recorded matter that is obtained (maximum value/minimum value; hereafter referred to as the "gloss ratio") when the ink duty values of color ink compositions of the same color are varies, and the gloss ratio of the surface of the recorded matter that is obtained when the type of color ink composition used is varied (e. g., when the type or concentration of the pigment is varied), are small.

Accordingly, the gloss of the surface of the recorded matter formed by the recording material set of the present invention is substantially uniform between different ink duty values of the same color, and between different colors.

In the present invention, the dispersing resin in the color ink compositions and the aqueous polymer in the composition containing an aqueous polymer belong to a common category so that the gloss is substantially uniform as described above.

It is inferred that if the abovementioned dispersing resin and aqueous polymer thus belong to a common category, components such as the solvent and the like in the respective ink compositions are dried when recorded matter is formed by the recording material set of the present invention, and the coating film in the images formed by the remaining polymer and the coating film formed by the polymer in the ink receiving layer are substantially uniform, so that the gloss of the surface of the recorded matter (printed images) is substantially uniform.

Polymers (resins) that belong to a common category include polymers in ranges which are such that the coating films formed by the polymers have the same properties; examples of such polymers include polymers whose type, molecular weight, functional groups, particle size, Tg (glass transition temperature) and the like belong to the same category.

In particular, if the abovementioned dispersing resin and the abovementioned aqueous polymer are the same substance, gloss unevenness of the surface of the recorded matter can be more effectively suppressed, so that the uniformity in gloss can be greatly improved.

Polymers similar to those indicated as examples in the abovementioned ink set can be used as the dispersing resin in the color ink compositions and the aqueous polymer contained in the composition containing an aqueous polymer; identical substances can be appropriately selected from the abovementioned examples and used.

Components other than the dispersing resin contained in the color ink composition may be similar to those explained for the ink set in the above.

The recording medium used in the recording material set of the present invention has an ink receiving layer that is constructed from a composition containing an aqueous polymer.

Here, the composition containing an aqueous polymer that forms the ink receiving layer contains the abovementioned aqueous polymer as an essential components. Furthermore, components other than the aqueous polymer that are contained in the composition containing an aqueous polymer may be any desired components that are ordinarily contained in an ink receiving layer.

Such components other than the aqueous polymer generally include ink absorbing pigments, and may also include various types of additives such as ink fixing agents, binders, impregnating agents, surfactants, dye fixing agents (anti-hydration agents), fluorescent whiteners, defoaming agents, pH adjusting agents, anti-mold agents, ultraviolet absorbing agents, antioxidants, leveling agents, viscosity adjusting agents and the like if necessary.

Conventional universally known agents may be used as ink absorbing pigments. In particular, minute inorganic particles that are porous and have a low refractive index are desirable in order to obtain a high ink absorptivity and coloring density. For example, amorphous silica, precipitated silica, gel type silica, alumina (preferably alumina with a quasi-boehmite structure), vapor phase process silica, barium sulfate, titanium dioxide, calcium carbonate, kaolin, clay, magnesium silicate, calcium silicate and the like may be used. Among these substances, vapor phase process silica is most desirable from the standpoints of high ink absorptivity and glossiness.

For example, such a recording medium can be obtained by using a coating liquid of the type described in detail in the second ink jet recording method, applying this coating liquid to a support by a method such as coating or the like, and appropriately drying this coating liquid. Furthermore, there are no particular restrictions on the support used, as long as this support is ordinarily used in recording media.

(Recording Medium)

The present invention provides a recording medium which has an ink receiving layer constructed from a composition containing an aqueous polymer, wherein the aqueous polymer contained in the abovementioned composition containing an aqueous polymer is the same substance as the dispersing resin in the color ink compositions that are discharged onto the recording medium.

Here, the term "same substance" refers to polymers whose type and characteristics such as molecular weight, structure and the like agree to an extent that the effect of the present invention can be achieved. For example, some of the substituent groups or the like may differ within ranges that allow the effect of the present invention to be achieved; however, it is desirable that the abovementioned characteristics show complete agreement.

Polymers similar to those indicated as examples in the abovementioned ink set can be used as the dispersing resin in the color ink compositions and the aqueous polymer contained in the composition containing an aqueous polymer; identical substances (the same substances) can be appropriately selected from the abovementioned examples and used.

Furthermore, in regard to components other than the dispersing resin contained in the color ink compositions, components similar to those described in the abovementioned ink set may be used.

Furthermore, other descriptions (mixture amounts and the like) regarding the color ink compositions may be appropriately applied.

The recording medium of the present invention has an ink receiving layer constructed from a composition containing an aqueous polymer.

A composition similar to those described in the abovementioned recording material set can be used as the composition containing an aqueous polymer that forms the ink receiving layer.

The recording medium of the present invention is especially suitable for use in ink jet recording.

In the recording medium of the present invention, since an aqueous polymer that is the same as the dispersing resin contained in the color ink compositions that are discharged onto the abovementioned recording medium is contained in the ink receiving layer, the gloss of the surface of the recording matter (especially printed images) that is formed in cases where printing is performed using the abovementioned recording medium can be made substantially uniform; in particular, this gloss can be made substantially uniform between different ink duty values of the same color and between different colors.

Furthermore, as long as the effect of the present invention can be achieved, the recording medium of the present invention may also have layers such as a glossy layer, anti-curling back coating layer or the like.

(Recording Medium Manufacturing Method)

The method used to manufacture the abovementioned recording medium includes a step in which an ink receiving layer is formed on a support using a composition containing an aqueous polymer that is the same as the dispersing resin in the color ink compositions that are discharged onto the recording medium.

Here, the term "same" refers to the fact that types and characteristics such as molecular weight, structure and the like of the polymers agree to an extent that allows the effect of the present invention to be achieved. For example, some of the substituent groups or the like may differ within ranges that allow the effect of the present invention to be achieved; however, it is desirable that the abovementioned characteristics show complete agreement.

Color ink compositions and compositions containing an aqueous polymer similar to those described in the recording medium may be used as these color ink compositions and compositions containing an aqueous polymer. Furthermore, a support similar to that described in the ink jet recording method may be used as the support.

For example, a method in which an ink receiving layer is formed by coating the surface of the support with a coating liquid consisting of the abovementioned composition containing an aqueous polymer, or a method in which the support is dipped in the abovementioned coating liquid, may be employed as the method used to form the abovementioned ink receiving layer consisting of a composition that contains an aqueous polymer.

Examples of methods that can be used to form the ink receiving layer by coating with a coating liquid include roll coating methods, grade coating methods, air knife coating methods, rod bar coating methods, gravure coating methods, comma coating methods, die coating methods, sliding lip coating methods, extrusion methods and the like.

The weight of the ink receiving layer (amount of application of the coating liquid used to form the ink receiving layer (calculated in terms of solid content)) may be appropriately determined; generally, a value of approximately 5 to 250 $g/m^2$ is desirable.

An ink receiving layer is obtained by appropriately drying the composition containing an aqueous polymer that has thus been applied as a coating.

(Recorded Matter)

The present invention provides recorded matter in which printed images are formed on a recording medium using the abovementioned ink set, recording method, recording material set or recording medium.

The recorded matter of the present invention is formed using the abovementioned ink set, the abovementioned recording method (first recording method or second recording method), the abovementioned recording material set or the abovementioned recording medium. Accordingly, gloss unevenness is suppressed, so that the recorded matter has a surface (printed images) with uniform gloss.

EXAMPLES

The present invention will be concretely described below in terms of examples; however, these examples do not limit the scope of the present invention in any way.

Ink Set and Ink Jet Recording Method

A plurality of color ink compositions (a total of four colors, i. e., yellow, magenta, cyan and black) and a single clear ink composition were mounted in a PM-800C ink jet recording printer (manufactured by Seiko-Epson K.K.). Furthermore, this printer can use six types of ink compositions; among these, the abovementioned four types of color ink compositions and the abovementioned single clear ink composition were used as five types of ink compositions, and the remaining single ink composition capacity was not used. Using this printer, the set mode of printing was set as the recommended "clear" mode by the printer driver, and solid 50 mm×50 mm regions were printed for each combination of the respective color ink compositions and clear ink composition on PM photographic paper (manufactured by Seiko-Epson K.K.) used as a recording medium. In this case, printed images were formed by discharging the color ink compositions and the clear ink composition from the printer head at the same treatment time.

In regard to the printed patterns, the ink duty values of the respective color ink compositions and clear ink compositions (units; %) were adjusted as described below (10 patterns) when images (yellow (Y) images, magenta (M) images, cyan (C) images and black (Bk) images, respectively) were formed by respective combinations of the yellow ink composition, magenta ink composition, cyan ink composition and black ink composition with the clear ink composition, so that a plurality of printed images corresponding to various ink duty values were formed for each color.

| (Pattern) | 1 | 2 | 3 | 4 | 5 | 6 | 7 | 8 | 9 | 10 |
|---|---|---|---|---|---|---|---|---|---|---|
| (Color Ink Composition) | 10 | 20 | 30 | 40 | 50 | 60 | 70 | 80 | 90 | 100 |
| (Clear Ink Composition) | 90 | 80 | 70 | 60 | 50 | 40 | 30 | 20 | 10 | 0 |

Furthermore, red (R) images were formed from the yellow ink composition, magenta ink composition and clear ink composition, green (G) images were formed from the yellow ink composition, cyan ink composition and clear ink composition, and blue (B) images were formed from the magenta ink composition, cyan ink composition and clear ink composition. The printing method used was the same as in the case where the abovementioned Y, M, C and Bk images were formed; furthermore, the printed patterns were 10 patterns similar to those described above. In this case, the respective ink duty values of both color ink compositions in the two types of color ink compositions were set at 5%+5% (total of 10%), . . . , 45%+45% (total of 90%) and 50%+50% (total of 100%), so that both values were the same at half the ink duty of the total ink color composition.

Examples 1 and 2, and Comparative Example 1

The mixture compositions of the color ink compositions and clear ink compositions forming the respective ink sets of Examples 1 and 2 and Comparative Example 1 are respectively shown in Tables 1, 2 and 3.

TABLE 1

(Example 1)

| | Wt % | | | | |
|---|---|---|---|---|---|
| | Yellow ink 1 | Magenta ink 1 | Cyan ink 1 | Black ink 1 | Clear ink 1 |
| C. I. pigment yellow 74 | 3.5 | | | | |
| C. I. pigment red 202 | | 3 | | | |
| C. I. pigment blue 15:3 | | | 2.5 | | |
| Carbon black MA-100B (manufactured by Mitsubishi Kagaku) | | | | 4 | |
| Aqueous solution of resin (Joncryl 61J, aqueous polymer component 30.5%) | 5.5 | 5 | 4 | 6.5 | 3 |
| Glycerol | 13 | 13 | 15 | 12 | 14 |
| Ethylene glycol | 3 | 3 | 3 | 4 | 5 |
| Olfine E1010 | 0.7 | 0.6 | 0.7 | 0.5 | 0.5 |
| Triethylene glycol monobutyl ether | 5 | 5 | 5 | 5 | 5 |
| Pure water | Remainder | Remainder | Remainder | Remainder | Remainder |

TABLE 2

(Example 2)

| | Wt % | | | | |
|---|---|---|---|---|---|
| | Yellow ink 2 | Magenta ink 2 | Cyan ink 2 | Black ink 2 | Clear ink 2 |
| C. I. pigment yellow 74 | 3 | | | | |
| C. I. pigment red 202 | | 3 | | | |
| C. I. pigment blue 15:3 | | | 3 | | |
| Carbon black MA-100B (manufactured by Mitsubishi Kagaku) | | | | 3 | |
| Resin emulsion (Joncryl 450, aqueous polymer component 43%) | 3.5 | 3.5 | 3.5 | 3.5 | 2.5 |
| Glycerol | 14 | 14 | 16 | 13 | 15 |
| Ethylene glycol | 3 | 3 | 3 | 5 | 5 |
| Olfine E1010 | 0.5 | 0.5 | 0.5 | 0.5 | 0.7 |
| Triethylene glycol monobutyl ether | 5 | 5 | 5 | 5 | 7 |
| Pure water | Remainder | Remainder | Remainder | Remainder | Remainder |

TABLE 3

(Comparative Example 1)

| | Wt % | | | | |
|---|---|---|---|---|---|
| | Yellow ink 2 | Magenta ink 2 | Cyan ink 2 | Black ink 2 | Clear ink 3 |
| C. I. pigment yellow 74 | 3 | | | | |
| C. I. pigment red 202 | | 3 | | | |
| C. I. pigment blue 15:3 | | | 3 | | |
| Carbon black MA-100B (manufactured by Mitsubishi Kagaku) | | | | 3 | |
| Resin emulsion (Voncoat 5454, manufactured by Dai-Nippon Inki K.K., aqueous polymer component 45%) | | | | | 3 |
| Aqueous solution of resin (Joncryl 61J, aqueous polymer component 30.5%) | | | | | 5 |
| Resin emulsion (Joncryl 450, aqueous polymer component 43%) | 3.5 | 3.5 | | 3.5 | |
| Glycerol | 14 | 14 | 16 | 13 | 15 |
| Ethylene glycol | 3 | 3 | 3 | 5 | 5 |
| Olfine E1010 | 0.5 | 0.5 | 0.5 | 0.5 | 0.7 |
| Triethylene glycol monobutyl ether | 5 | 5 | 5 | 5 | 7 |
| Pure water | Remainder | Remainder | Remainder | Remainder | Remainder |

(Note)
"Joncryl" resins are all manufactured by Johnson Polymer K.K.

The total amount of resin emulsion mixed with the composition indicates the total amount of emulsion including the aqueous polymer and Olfine E1010 (surfactant). The mixture amounts of Olfine E1010 all indicate amounts that are included in the resin emulsion.

Comparative Example 2

The ink set of Comparative Example 2 was formed as an ink set similar to that of Comparative Example 1, except that no clear ink was used; i. e., an ink set consisting only of a plurality of color ink compositions. In the case of the ink set of this Comparative Example 2, respective images which were adjusted so that the ink duty values of the color ink compositions were 100% were formed.

(Evaluation of Gloss Unevenness)

The 60° specular gloss was measured by means of a PG-1M gloss meter (manufactured by Nippon Denshoku Kogyo K.K.) for respective ink duty values of the respective colored printed images obtained. Afterward, the gloss ratio between different ink duty values of the same color (maximum value/minimum value; the value of this ratio is called "gloss ratio 1") was calculated from the maximum and minimum values among the gloss values of the respective images formed by the respective ink duty values, and the gloss unevenness was evaluated using the following criteria.
A: Gloss ratio of 1.0 or greater, but less than 1.3
B: Gloss ratio of 1.3 or greater, but less than 1.5
C: Gloss ratio of 1.5 or greater Furthermore, the maximum values of the gloss of the respective images formed at each ink duty were determined in the printed images of all of the colors, and the maximum and minimum values among these determined values were further determined. Then, the gloss ratio between different colors (maximum value/minimum value) was determined (the value of this ratio is called "gloss ratio 2") was determined from these values, and the gloss unevenness was evaluated using the following criteria.
A: Gloss ratio of 1.0 or greater, but less than 1.2
B: Gloss ratio of 1.2 or greater, but less than 1.5
C: Gloss ratio of 1.5 or greater The evaluation results (gloss ratios 1 and 2) for the gloss unevenness of the printed images formed using the respective ink sets of Examples 1 and 2 and Comparative Examples 1 and 2 are shown in Table 4.

TABLE 4

(Evaluation Results)

| | Gloss ratio 1 | | | | | | | Gloss ratio 2 |
|---|---|---|---|---|---|---|---|---|
| | Y | M | C | Bk | R | G | B | |
| Example 1 | A | A | A | A | A | A | A | A |
| Example 2 | A | A | A | A | A | A | A | A |
| Comparative Example 1 | B | B | A | A | B | A | A | B |
| Comparative Example 2 | C | C | C | C | B | B | B | C |

As is clear from the results shown in Table 4, in cases where images are formed by the ink set of the present invention (Examples 1 and 2), the gloss ratio between different ink duty values of the same color can be reduced, and the gloss ratio between different colors can also be reduced, thus indicating a superior effect in suppressing gloss unevenness of the printed images. As a result, it is clear that the ink set of the present invention makes it possible to obtain images with uniform luster in the same recorded matter.

Ink Jet Recording Method, Recording Medium and Recording Material Set

<Manufacture of Support>

Leaf bleached kraft pulp (LBKP) and needle bleached kraft pulp (NBKP) were mixed at a ratio of 1:1, and a pulp slurry was prepared by beating this mixture open to a Canadian standard freeness of 300 ml. An alkyl ketene dimer was added to this as a sizing agent at the rate of 0.5 wt % relative to the pulp, a polyacrylamide was added as a reinforcing agent at the rate of 1.0 wt % relative to the pulp, cationized starch was added at the rate of 2.0 wt % relative to the pulp, a polyamide-epichlorohydrin resin was added at the rate of 0.5 wt % relative to the pulp, and this mixture was diluted with water to form a 1% slurry. This slurry was made into paper with a weight of 130 g/m² using a long mesh papermaking machine, thus producing a stock paper consisting of a polyolefin resin coated paper. A resin composition consisting of 70 parts by weight of a low-density polyethylene, 20 parts by weight of a high-density polyethylene and 10 parts by weight of titanium oxide was melted at 320° C. and applied as a coating to this stock paper by extrusion so that the coating amount was 27 g/m², and this was extrusion-coated using a cooling roll finished to a fine rough surface. Next, the back surface of the stock paper was similarly extrusion-coated with a resin composition consisting of 70 parts by weight of a high-density polyethylene resin and 30 parts by weight of a low-density polyethylene resin so that the coating amount was 25 g/m². In this way, a resin-coated paper was obtained as a support.

<Manufacture of Recording Medium>

The abovementioned support was coated with an ink receiving layer coating liquid having the composition described below by means of a sliding bead coating apparatus, and this coating was dried. The ink receiving layer coating liquids described below were prepared with water so that the solid content of the vapor phase process silica was 9 wt %. These coating liquids were applied so that the coating amount of the vapor phase process silica was 18 g/m² in terms of solid content, and the resulting coatings were dried, thus producing samples of a recording medium.

<Printing Method and Printed Patterns>

In regard to the printing method, printed images were formed in the same manner as in the examples of the ink set and ink jet recording method using the ink set, using the recording medium prepared as described above or PM photographic paper (manufactured by Seiko-Epson K.K.) as the recording medium, except that no clear ink composition was mounted in the PM-800C ink jet recording printer (manufactured by Seiko-Epson K.K.). Furthermore, the printed patterns were also 10 patterns in the same manner as described above.

Furthermore, in the case of the red (R) images, green (G) images and blue (B) images, printing was performed in the same manner as when the abovementioned Y, M, C and Bk images were formed, except that no clear ink composition was used. Furthermore, the printed patters also consisted of 10 patterns in the same manner as described above.

Examples 3 and 4 and Comparative Example 3

Coating liquid 1, coating liquid 2 and coating liquid 3 having the compositions shown below were respectively used in Examples 3 and 4 and Comparative Example 3. Furthermore, the mixture compositions of the color ink compositions forming the respective inks of Examples 3 and 4 and Comparative Example 3 are shown in Tables 5, 6 and 7.

<Coating Liquid 1 (Example 3)>

| | |
|---|---|
| Vapor phase process silica (mean primary particle diameter 7 nm, specific surface area as measured by the BET method: 300 m²/g) | 100 parts |
| Boric acid | 4 parts |
| Amphoteric surfactant (commercial name: SWAM AM-2150, manufactured by Nippon Surfactant) | 0.3 parts |
| Aqueous solution of resin (commercial name: Joncryl 61J, manufactured by Johnson Polymer K.K., aqueous polymer component 30.5%) | 10 parts |

<Coating Liquid 2 (Example 4)>

| | |
|---|---|
| Vapor phase process silica (mean primary particle diameter 7 nm, specific surface area as measured by the BET method: 300 m²/g) | 100 parts |
| Boric acid | 4 parts |
| Amphoteric surfactant (commercial name: SWAM AM-2150, manufactured by Nippon Surfactant) | 0.3 parts |
| Resin emulsion (commercial name: Joncryl 450, manufactured by Johnson Polymer K.K., aqueous polymer component 43%) | 8 parts |

<Coating Liquid 3 (Comparative Example 3)>

| | |
|---|---|
| Vapor phase process silica (mean primary particle diameter 7 nm, specific surface area as measured by the BET method: 300 m²/g) | 100 parts |
| Boric acid | 4 parts |
| Amphoteric surfactant (commercial name: SWAM AM-2150, manufactured by Nippon Surfactant | 0.3 parts |
| Resin emulsion (commercial name: Voncoat 5454, manufactured by Dai-Nippon Inki K.K., aqueous polymer content 45%) | 8 parts |

TABLE 5

(Example 3)

| | Wt % | | | |
|---|---|---|---|---|
| | Yellow ink 1 | Magenta ink 1 | Cyan ink 1 | Black ink 1 |
| C. I. pigment yellow 74 | 3.5 | | | |
| C. I. pigment red 202 | | 3 | | |
| C. I. pigment blue 15:3 | | | 2.5 | |
| Carbon black MA-100B (manufactured by Mitsubishi Kagaku) | | | | 4 |
| Aqueous solution of resin (Joncryl 61J, aqueous polymer component 30.5%) | 5.5 | 5 | 4 | 6.5 |
| Glycerol | 13 | 13 | 15 | 12 |
| Ethylene glycol | 3 | 3 | 3 | 4 |
| Olfine E1010 | 0.7 | 0.6 | 0.7 | 0.5 |
| Triethylene glycol monobutyl ether | 5 | 5 | 5 | 5 |
| Pure water | Remainder | Remainder | Remainder | Remainder |

TABLE 6

(Example 4)

| | Wt % | | | |
|---|---|---|---|---|
| | Yellow ink 2 | Magenta ink 2 | Cyan ink 2 | Black ink 2 |
| C. I. pigment yellow 74 | 3 | | | |
| C. I. pigment red 202 | | 3 | | |
| C. I. pigment blue 15:3 | | | 3 | |
| Carbon black MA-100B (manufactured by Mitsubishi Kagaku) | | | | 3 |
| Resin emulsion (Joncryl 450, aqueous polymer component 43%) | 3.5 | 3.5 | 3.5 | 3.5 |
| Glycerol | 14 | 14 | 16 | 13 |
| Ethylene glycol | 3 | 3 | 3 | 5 |
| Olfine E1010 | 0.5 | 0.5 | 0.5 | 0.5 |
| Triethylene glycol monobutyl ether | 5 | 5 | 5 | 5 |
| Pure water | Remainder | Remainder | Remainder | Remainder |

TABLE 7

(Comparative Example 3)

| | Wt % | | | |
|---|---|---|---|---|
| | Yellow ink 2 | Magenta ink 2 | Cyan ink 2 | Black ink 2 |
| C. I. pigment yellow 74 | 3 | | | |
| C. I. pigment red 202 | | 3 | | |
| C. I. pigment blue 15:3 | | | 3 | |
| Carbon black MA-100B (manufactured by Mitsubishi Kagaku) | | | | 3 |

TABLE 7-continued (Comparative Example 3)

| | Wt % | | | |
|---|---|---|---|---|
| | Yellow ink 2 | Magenta ink 2 | Cyan ink 2 | Black ink 2 |
| Aqueous solution of resin (Joncryl 61J, aqueous polymer component 30.5%) | | | 5 | |
| Resin emulsion (Joncryl 450, aqueous polymer component 43%) | 3.5 | 3.5 | | 3.5 |
| Glycerol | 14 | 14 | 16 | 13 |
| Ethylene glycol | 3 | 3 | 3 | 5 |
| Olfine E1010 | 0.5 | 0.5 | 0.5 | 0.5 |
| Triethylene glycol monobutyl ether | 5 | 5 | 5 | 5 |
| Pure water | Remainder | Remainder | Remainder | Remainder |

(Note) "Joncryl" resins are all manufactured by Johnson Polymer K.K.

The total amount of resin emulsion mixed with the composition indicates the total amount of emulsion including the aqueous polymer and Olfine E1010 (surfactant). The mixture amounts of Olfine E1010 all indicate amounts that are included in the resin emulsion.

Comparative Example 4

In Comparative Example 4, a plurality of color ink compositions similar to those of Example 3 were used. Furthermore, printing was performed using PM photographic paper (manufactured by Seiko-Epson K.K.) as a recording medium.

(Evaluation of Gloss Unevenness)

The 60° specular gloss was measured by means of a PG-1M gloss meter (manufactured by Nippon Denshoku Kogyo K.K.) for respective ink duty values of the respective colored printed images obtained. Afterward, the gloss ratio between different ink duty values of the same color (maximum value/minimum value; the value of this ratio is called "gloss ratio 1") was calculated from the maximum and minimum values among the gloss values of the respective images formed by the respective ink duty values, and the gloss unevenness was evaluated using the following criteria.
A: Gloss ratio of 1.0 or greater, but less than 1.3
B: Gloss ratio of 1.3 or greater, but less than 1.5
C: Gloss ratio of 1.5 or greater Furthermore, the maximum values of the gloss of the respective images formed at each ink duty were determined in the printed images of all of the colors, and the maximum and minimum values among these determined values were further determined. Then, the gloss ratio between colors (maximum value/minimum value) was determined (the value of this ratio is called "gloss ratio 2") was determined from these values, and the gloss unevenness was evaluated using the following criteria.

A: Gloss ratio of 1.0 or greater, but less than 1.2
B: Gloss ratio of 1.2 or greater, but less than 1.5
C: Gloss ratio of 1.5 or greater The evaluation results (gloss ratios 1 and 2) for the gloss unevenness of the printed images formed by means of Examples 3 and 4 and Comparative Examples 3 and 4 are shown in Table 8.

Example 5

Using the ink set of Example 1, the clear ink composition alone was discharged onto PM photographic paper beforehand so that the ink duty was 40%, and this discharged composition was dried. Afterward, printed images were formed by the same method as in Example 1 using the color ink compositions of the ink set of example 1 on the PM photographic paper that had thus been pre-treated with the clear ink composition. Furthermore, as in Example 1, the printed patterns consisted of 10 patterns, and an evaluation was performed using similar criteria.

The results obtained are shown in Table 8.

TABLE 8

(Evaluation Results)

| | Gloss ratio 1 | | | | | | | Gloss ratio 2 |
|---|---|---|---|---|---|---|---|---|
| | Y | M | C | Bk | R | G | B | |
| Example 3 | A | A | A | A | A | A | A | A |
| Example 4 | A | A | A | A | A | A | A | A |
| Comparative Example 3 | B | B | B | B | B | B | A | B |
| Comparative Example 4 | C | C | C | C | C | C | C | C |
| Example 5 | A | A | A | A | A | A | A | A |

As is clear from the results shown in Table 8, in cases where images are formed by the recording method of the present invention (Examples 3 through 5), the gloss ratio between different ink duty values of the same color can be reduced, and the gloss ratio between different colors can also be reduced; accordingly, it is seen that the method of the present invention has a superior effect in suppressing gloss unevenness of the printed images. As a result, it is clear that a recorded matter surface (images) with uniform luster can be obtained in the same recorded matter by using the recording method, recording medium and recording material set of the present invention.

The ink set of the present invention has a superior effect in suppressing gloss unevenness of printed images, and makes it possible to obtain printed images that have uniform luster.

Furthermore, gloss unevenness of printed images can also be suppressed by using the recording method, recording material set and recording medium of the present invention, so that images with uniform luster can be obtained.

What is claimed is:

1. An ink jet recording method comprising: (a) providing an ink set with constituents comprising one or more color ink compositions containing a pigment as a coloring agent and a dispersing resin used to disperse the pigment; and one or more clear ink compositions that contain an aqueous polymer and that contain no coloring agent; wherein each of said dispersing resin and said aqueous polymer is such that the 60° specular gloss, according to JIS Z 8741, of recorded images formed by said color ink compositions and/or said clear ink compositions is substantially uniform; and (b)

forming printed images on a recording medium by discharging said color ink compositions and said clear ink compositions in said ink set during the same treatment time, wherein the forming comprises adjusting amounts of said clear ink compositions that are discharged in accordance with the ink duty of said color ink compositions, wherein each of the dispersing resin and the aqueous polymer is a salt of styrene-(meth)acrylic acid copolymer and the printed images are formed on the recording medium with a substantially uniform gloss.

2. The ink jet recording method according to claim 1, wherein each of the dispersing resin and the aqueous polymer is the same salt of styrene-(meth)acrylic acid copolymer.

3. The ink jet recording method according to claim 1, wherein the salt of styrene-(meth)acrylic acid copolymer has an acid value in a range of 50 to 300.

4. The ink jet recording method according to claim 1, wherein the constituents are such that the method provides a gloss ratio between different ink duty values of the same color of 1.0 or greater but less than 1.3.

5. The ink jet recording method according to claim 1, wherein the ink set comprises a plurality of color inks and step (b) comprises forming the printed images with each of the plurality of color inks.

6. The ink jet recording method according to claim 5, wherein the constituents are such that the method provides a gloss ratio between the plurality of colors of 1.0 or greater but less than 1.2.

7. The ink jet recording method according to claim 6, wherein the constituents are such that the method provides a gloss ratio between different ink duty values of the same color of 1.0 or greater but less than 1.3.

* * * * *